(12) United States Patent
Mullen et al.

(10) Patent No.: US 10,484,644 B2
(45) Date of Patent: *Nov. 19, 2019

(54) COPY COUNT FOR DTCP WITH AN ABBREVIATION HASH USED FOR CHECK IN COPY

(71) Applicant: ARRIS Enterprises LLC, Suwanee, GA (US)

(72) Inventors: Brian D. Mullen, Duluth, GA (US); Geetha Mangalore, San Diego, CA (US); Paul Moroney, La Jolla, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/496,727

(22) Filed: Apr. 25, 2017

(65) Prior Publication Data

US 2017/0230609 A1 Aug. 10, 2017

Related U.S. Application Data

(63) Continuation of application No. 14/632,320, filed on Feb. 26, 2015, now Pat. No. 9,667,911.

(Continued)

(51) Int. Cl.
*H04N 5/913* (2006.01)
*H04L 29/06* (2006.01)
(Continued)

(52) U.S. Cl.
CPC ....... *H04N 5/913* (2013.01); *G11B 20/00971* (2013.01); *H04L 63/10* (2013.01);
(Continued)

(58) Field of Classification Search
CPC ............... H04N 5/913; H04N 21/4627; H04N 21/6125; H04N 21/4147;
(Continued)

(56) References Cited

U.S. PATENT DOCUMENTS

2003/0070082 A1* 4/2003 Nimura ............ G11B 20/00086
713/193
2006/0115241 A1* 6/2006 Saigo ............... G11B 20/00086
386/239

(Continued)

OTHER PUBLICATIONS

DTCP-Plus-Presentation-for-Cptwg, Oct. 2011.*
(Continued)

*Primary Examiner* — Loi H Tran
(74) *Attorney, Agent, or Firm* — Thomas A. Ward

(57) ABSTRACT

A Digital Rights Management (DRM) system is provided that reduces time for a move transaction using DTCP-IP when a copy is moved back or checked back in to an originating Personal Video Recorder (PVR). During a DTCP MOVE transaction, instead of transferring the full asset in a check back in operation to the PVR, a unique and abbreviated representation of the original copy of the asset would be made for the transfer. This abbreviated representation takes the form of a hash constructed from a hashing function which uses characteristics of the asset as inputs. This hash will have to be a unique and near guaranteed indicator of the original content, to a high probability, so that the copy control system could live up to the spirit of the DTCP spec and the DLNA interoperability guidelines.

6 Claims, 3 Drawing Sheets

Related U.S. Application Data

(60) Provisional application No. 61/944,695, filed on Feb. 26, 2014.

(51) Int. Cl.
*G11B 20/00* (2006.01)
*H04N 21/442* (2011.01)
*H04N 21/4367* (2011.01)
*H04N 21/4627* (2011.01)
*H04N 21/4147* (2011.01)
*H04N 21/61* (2011.01)

(52) U.S. Cl.
CPC ..... *H04N 21/4147* (2013.01); *H04N 21/4367* (2013.01); *H04N 21/44204* (2013.01); *H04N 21/4627* (2013.01); *H04N 21/6125* (2013.01); *H04N 2005/91364* (2013.01)

(58) Field of Classification Search
CPC .......... H04N 2005/91364; H04N 2005/91307; H04N 21/44204; G11B 20/00971; H04L 63/10
USPC ................................. 386/252, 291
See application file for complete search history.

(56) References Cited

U.S. PATENT DOCUMENTS

| | | | |
|---|---|---|---|
| 2007/0101186 A1* | 5/2007 | Chen | G06F 11/1456 714/6.11 |
| 2007/0162753 A1 | 7/2007 | Nakano et al. | |
| 2008/0015997 A1* | 1/2008 | Moroney | G06F 21/10 705/51 |
| 2012/0128331 A1 | 5/2012 | Tsuruga et al. | |
| 2012/0315017 A1 | 12/2012 | Matsushita et al. | |

OTHER PUBLICATIONS

"DTCP Plus, Overview Presentation", Digital Transmission Licensing Administrator, dated Oct. 26, 2011.

"Digital Transmission Content Specification: vol. 1", Digital Transmission Licensing Administrator, Revision 1.7 ED2, dated Jun. 5, 2013.

* cited by examiner

… (1 / 24) …

COPY COUNT FOR DTCP WITH AN ABBREVIATION HASH USED FOR CHECK IN COPY

CLAIM FOR PRIORITY

This Application is a Continuation of U.S. patent application Ser. No. 14/632,320, filed Feb. 26, 2015, which claimed priority to U.S. Provisional Application Ser. No. 61/499,695 filed on Feb. 26, 2014, both of which are incorporated herein by reference in their entirety.

BACKGROUND

Technical Field

The present invention relates to a Digital Rights Management (DRM) system used with the Digital Transmission Content Protection-Internet Protocol (DTCP-IP) standard to determine allowable copies of video to be made to client devices.

Related Art

Copy One Generation (COG) content now supports a counted copy use case, under the earlier-titled DTCP "plus" revision to DTCP-IP, now formally DTCP-IP 1.4.

In a typical counted copy control model with a maximum copy count, Max Count N, a Personal Video Recorder (PVR) is allowed to manage COG content copies as if it had a repository of N identical copies of the event. Each one would be marked on the PVR storage as copy no more (CNM) and could be transferred out under the DTCP Move transaction, and then deleted or disabled.

Any copy moved to another client device from the PVR would also be stored on that client device, and marked as CNM. As always, that copy could be further moved, but never copied. In this light, that copy can be moved back to the originating PVR, and again exist as a single copy on that drive along with the remaining copies.

DTCP copy management control allows a single one of N copies on the PVR to be stored, along with the parameter N, and a count, so long as the copy stored is exactly identical to the full N separate copies. This means a way to recognize when a copy is moved back is identical to the one already on the PVR is needed. This could be done by comparing the copy bit by bit to the one already present, and if identical, the moved back copy could be deleted and the existing copy count increased by one. This is what is called a "check in," like a library loan. Note that a "Max Copy Count" of N means that the original copy on the PVR is one of the N copies. A count of the copies remaining to be issued would then also be maintained. Thus the original recording process means the PVR device has a Max Count=N, and a remaining copy count=N−1. When a copy is transferred to a first client mobile device, then the remaining copy count would be N−2.

Following this DTCP model exactly, any move back would take minutes, depending on the size of the asset and the Wi-Fi or other connectivity to the PVR from the client. This time delay is believed undesirable for many DTCP users. It is desirable to provide a DRM system to handle copy control using the DTCP standard that would allow a move back of a copy that would take a minimal amount of time.

SUMMARY

Embodiments of the present invention provide a Digital Rights Management (DRM) system that reduces time for a move transaction using DTCP when a copy is moved back or checked into an originating PVR.

In one embodiment, current security features involved in a DTCP MOVE transaction would be used, but instead of transferring the full asset in a check back in operation to the PVR, a unique and abbreviated representation of the original copy of the asset is made. This abbreviated representation takes the form of a hash constructed from a hashing function which uses characteristics of the asset as inputs. This hash will provide a unique and near guaranteed indicator of the original content, to a high probability, so that the copy control system could live up to the spirit of the DTCP spec and the DLNA interoperability guidelines.

A further embodiment enables use of the hashing function for a copy made when transcoding is used to transfer the copy under a Sync 'n Go command. The Sync 'n Go command allows a copy to be made for backing up and synchronizing files to the same or different storage devices. DTCP allows the PVR to make a second recording in another format, so long as the original and the transcoded versions are bound together, and "live and die" together. Thus, when the PVR makes a second copy of COG content, transcodes that copy to a lower resolution Advanced Video Coding (AVC) or MPEG-4 coded file, and finally checks out and moves that second copy under a Sync 'n Go command, the remaining copy count is decremented when either the original copy or the transcoded copy are checked out.

Further, in one embodiment with a transferred Sync n' Go copy being checked in to the originating PVR, "check in" also being referred to as a "move back" operation, both the original and Sync 'n Go copies are retained by the PVR, rather than deleting the checked in copy. Behavior related to storage of assets after a DTCP-IP transfer is not detailed by the DTCP-IP specification of the assets are outside the scope of the DRM. As a result, deleting may or may not be done with a check-in to the PVR even with a DTCP move operation. But for a Sync 'n Go operation, the action of maintaining a copy for later comparison, validation or authentication purposes could be beneficial.

In DTCP, the Max Copy Count is not a defined parameter. Thus, in a further embodiment of the present invention, the Max Copy Count value is provided in DTCP as a defined alternate operator controlled delivery mechanism rather than a defined parameter. Further in this embodiment, a restriction list is provided with the Max Copy Count value and a channel identifier so that Max Copy Count can be applied to all assets recorded from that channel.

Several different hashing functions can be used for the abbreviated representation of the copy asset according to embodiments of the present invention. The different hashing functions include: (a) CRC based hash; (b) a cryptographic hash; and (c) an additive arithmetic hash operation.

BRIEF DESCRIPTION OF THE DRAWINGS

Further details of the present invention are explained with the help of the attached drawings in which.

DETAILED DESCRIPTION

System Overview

Figure 1:
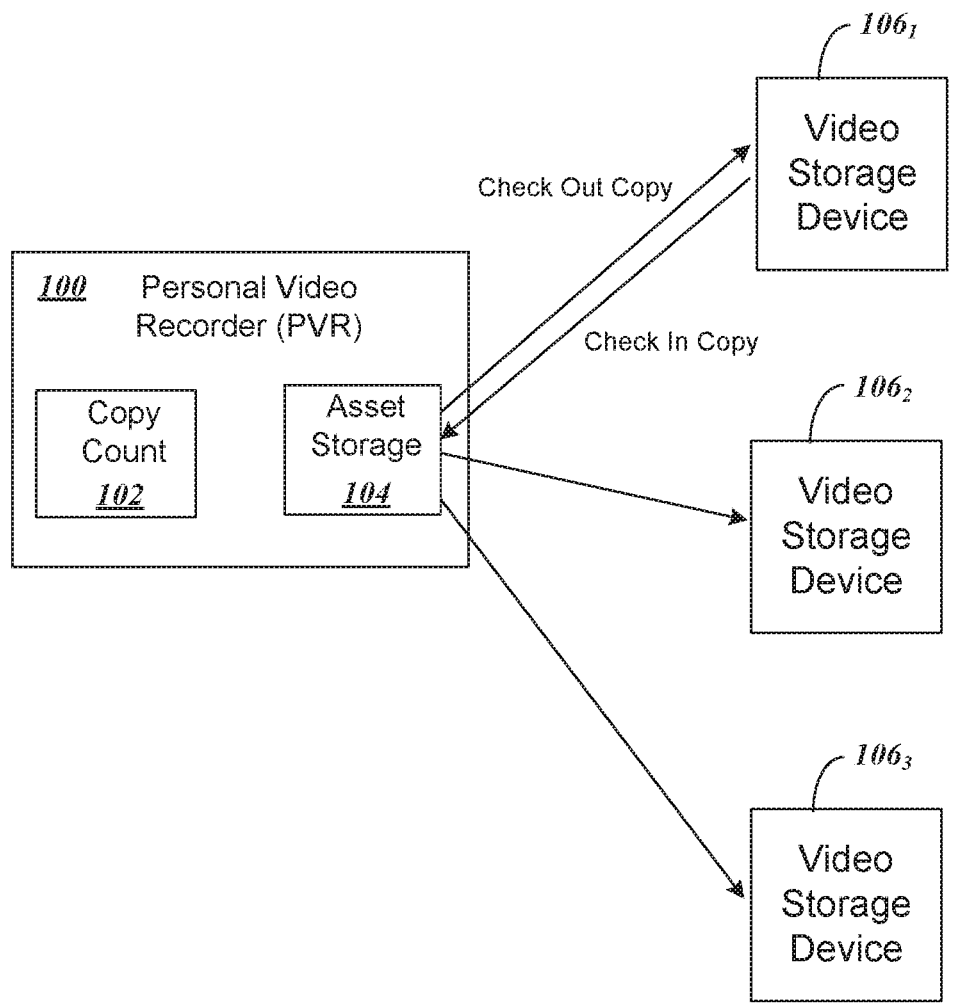
FIG. 1 is a block diagram illustrating a system with a PVR that transfers or checks out copies to multiple devices, as well as a one device that shows check in one of the copies.

FIG. 1 is a block diagram illustrating a system with a PVR 100 that transfers or checks out copies to multiple video storage devices $106_1$-$106_3$, as well as a check back in of one of the copies. The PVR 100 includes one or more processors that read code stored in memory to cause the processor to perform video storage and transfer according to embodiments of the present invention. The memory can include a copy count storage 102, or Max Copy Count variable storage, that is accessed by the processor to determine the number of copies of a video that the PVR 100 can transfer. The memory can further include an asset storage 104 that stores one or more copies of a video asset. The asset storage 104 can further include a check-out ledger that indicates when copies are checked out, separate from the copy count storage 102.

The PVR 100 can check out copies of a video asset from the asset storage and transfer the asset to one or more video storage devices $106_1$-$106_3$, the video storage devices $106_1$-$106_3$ being components like a DVR. The asset storage 104 can store more than one copy of a video. Current security features involved in a DTCP MOVE transaction would be used with embodiments of the present invention, but instead of transferring the full asset to and from the PVR asset storage 104 during check in, a unique and abbreviated representation of the original copy of the asset is provided. This abbreviated representation could take the form of a hash constructed from a hashing function which uses characteristics of the asset as inputs. This hash will have to be a unique and near guaranteed indicator of the original content, to a high probability, so that the copy control system could live up to the spirit of the DTCP spec and the DLNA interoperability guidelines. It is noted that for DTCP that playable content must be transferred at least once, so when the abbreviated representation is generated from a playable asset each device must have a copy of the playable asset before abbreviated representations can be used.

Hash Function Representation for Copy Asset

Figure 2:
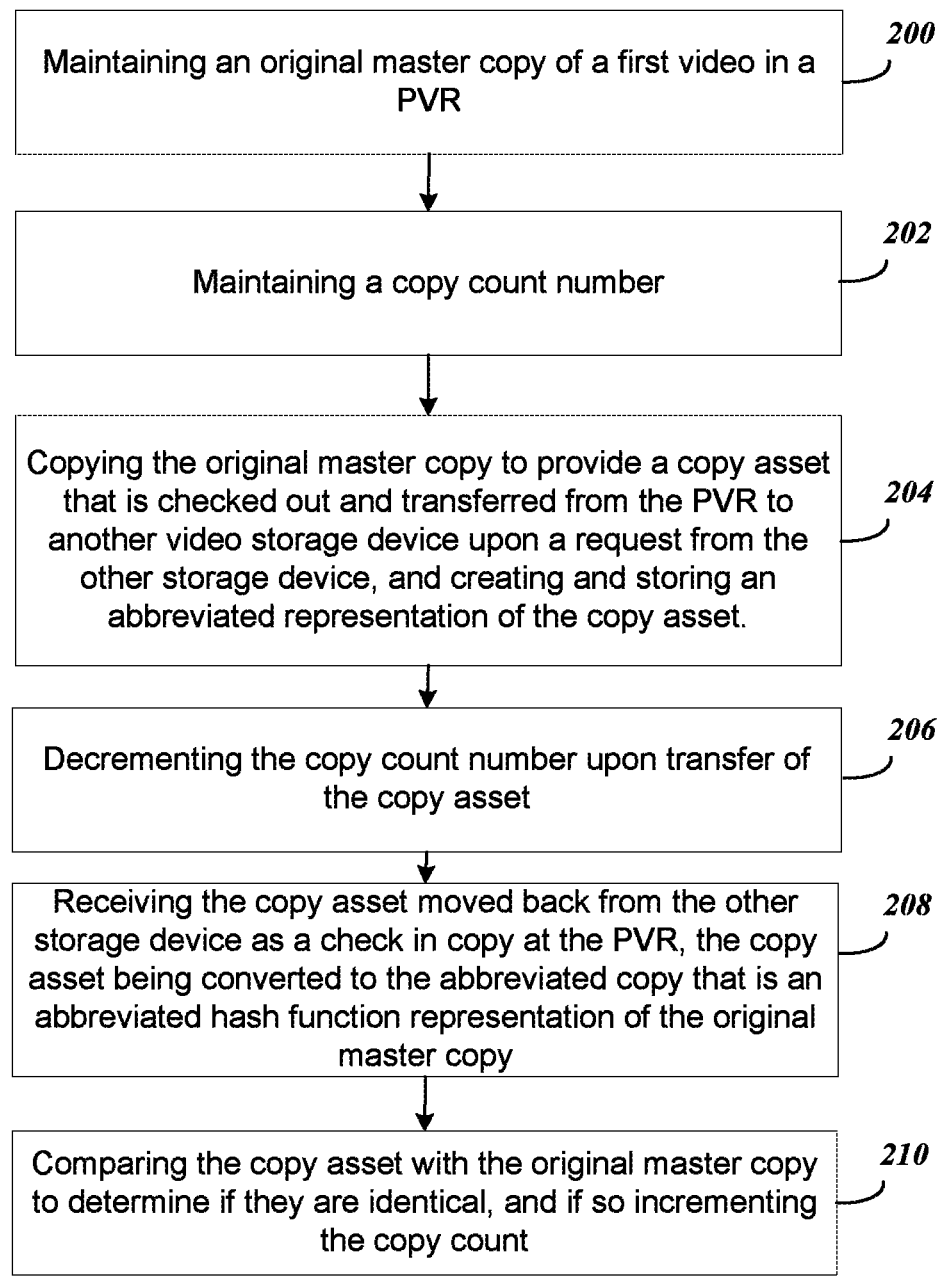
FIG. 2 is a flow chart showing an embodiment of the present invention wherein a hash is constructed for and used for check out and check back in of an asset copy.

FIG. 2 is a flow chart showing an embodiment of the present invention wherein a hash is constructed for and used for check out and check back in of an asset copy using a DTCP MOVE command. In a first step 200, an original master copy of a first video is maintained in the asset storage 104 of the PVR 100. In step 202, the copy count 102 is maintained in the storage 102 of the PVR 100. Next in step 204, the original master copy will be copied to create a copy asset in the storage 104. Upon a request from a storage device such as $106_1$, the copy asset is then transferred from the PVR to another video storage device, such as device $106_1$ and an abbreviated representation is generated and associated in a non-volatile fashion with the copy asset in the PVR 100. In step 206, the copy count number in storage 102 is decremented upon transfer or check out of the copy asset from storage 104 to a video storage device such as $106_1$. Next, in step 208, at a later time, the copy asset is moved back from the other storage device, such as $106_1$, as a check-in copy to the asset storage 104 of the PVR. The check-in copy asset is an abbreviated hash function representation of the original master copy. In a final step, the copy asset checked in is compared with the original master copy to determine if they are identical. If so, the copy count number in storage 102 is incremented.

In step 204, the actual original master copy is transferred. In a mobility solution, the copied asset is a transcoded copy from the original master copy recording. In other implementations, the transcoding step could be skipped and the original non-transcoded recording could be transferred in step 204. Only on check-in at step 208 would the abbreviated representation be created and used. The client receiving the checked out asset could use an algorithm identified or created by the PVR owner or server operating the PVR to enable creation of the abbreviated representation on the client side. A client would just need to run the copy asset through the algorithm to create the abbreviated representation. If there were no bit errors during transfer, the client should be able to calculate the same hash function as the server system would have created from the original master copy.

Sync n' Go Command

Figure 3:
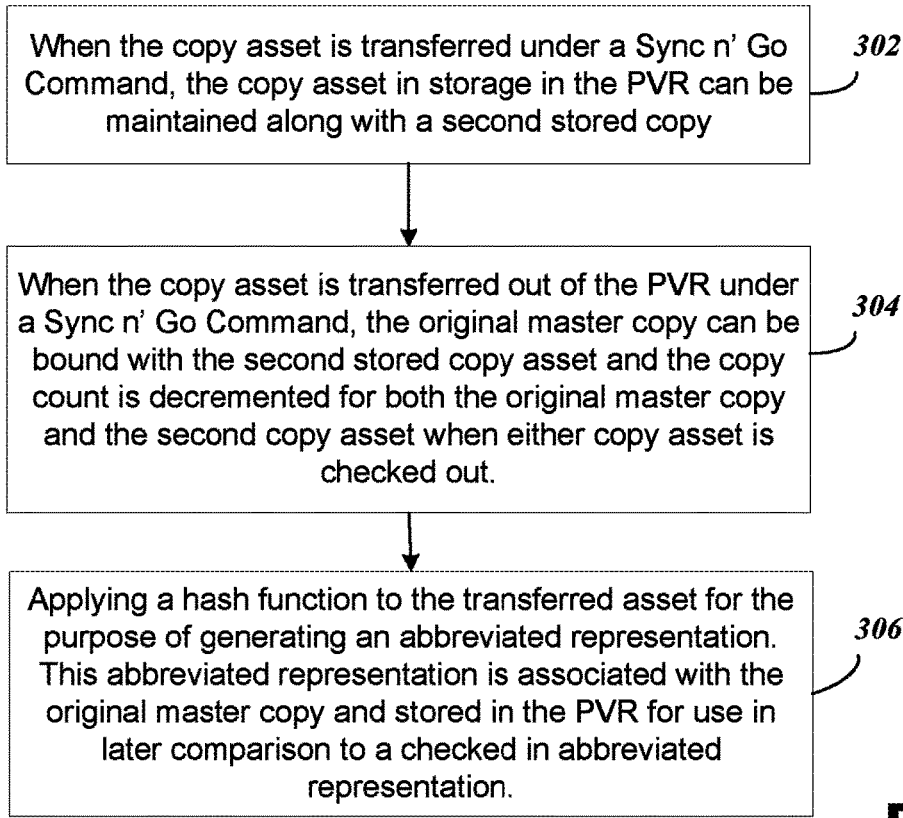
FIG. 3 provides a flow chart illustrating additional steps to those of FIG. 2 applied when the moved copy is checked back in under a Sync n' Go command.

FIG. 3 provides a flow chart illustrating additional steps to those of FIG. 2 applied when the moved copy is moved back or checked in under a Sync n' Go command. In this embodiment of the present invention, the hashing function can be used on the copied asset upon check back in when the copy asset is a transcoded copy that was originally transferred from the PVR under a Sync 'n Go command. The Sync 'n Go command allows a second copy to be made for backing up and synchronizing files to the same or different storage devices such as a DVD, flash zip or a remote server, and the second copy can be the transcoded copy. DTCP allows the PVR 100 to make the second recording in another format that can be saved in storage with the original asset in step 302, and still count it as the first copy, so long as the original and the transcoded versions are bound together, and "live and die" together. A specific recording format and storage are outside the scope of DTCP, as DTCP is only concerned with protection the asset during transfer, so the format of the second copy is not relevant to DTCP. With this second copy allowable, and the first and second copies bound together, when the PVR makes a copy of COG content with a Max Copy Count of N, and then transcodes that original to a lower resolution Advanced Video Coding (AVC) or MPEG-4 coded file for Sync 'n Go, the remaining copy count is decremented in step 304 when either the second transcoded copy or the first original master copy is transferred out of the PVR. In a further step 306, a hash function is applied to the transferred asset for the purpose of generating an abbreviated representation. This abbreviated representation is associated with the original master copy and stored in the PVR for use in later comparison to a checked in abbreviated representation.

With a transferred Sync n' Go copy being checked in to the storage 104 of the originating PVR 100, "check in" also being referred to as a "move back" operation, both the original and Sync 'n Go copies can be retained by the PVR, rather than deleting the checked in copy. Behavior related to storage of assets after a DTCP-IP transfer is not detailed by the DTCP-IP specification of the assets are outside the scope of the DRM. As a result, deleting may or may not occur with a check in to the PVR 100 even with a DTCP move operation. But with a Sync 'n Go operation, maintaining a copy for comparison could be beneficial.

As an example relating to deleting or keeping the separate check in transcoded copy, in an example, suppose that a PVR with a COG asset with Max Copy Count N has issued N−1 copies to mobile devices, and thus has a remaining copy count of zero (that is, no copies remaining to give out to mobile devices). By "mobile devices" the device can any remote video storage device such as a DVR, a tablet computer, a cell phone. The PVR can still stream and play without issue, using its last stored internal copy. However, if an $N^{th}$ mobile requests a copy, what can be done? If the PVR denies the copy, it can operate as before in so far as streaming and playback are concerned. If the PVR chooses to give out that last copy, it can certainly do so, so long as it deletes or disables the copy stored on the PVR (actually disabling its original recording as well as its internal bound sync N go copy). However, it is usually desirable not to delete the original high quality asset and its matching sync N go version, so that a subsequent check-in can still easily occur. Such a check-in process would compare the hash, and if it matches, re-enable the original high quality recording and its matching Sync 'n Go version.

Copy Count Parameter for DTCP

Figure 4:
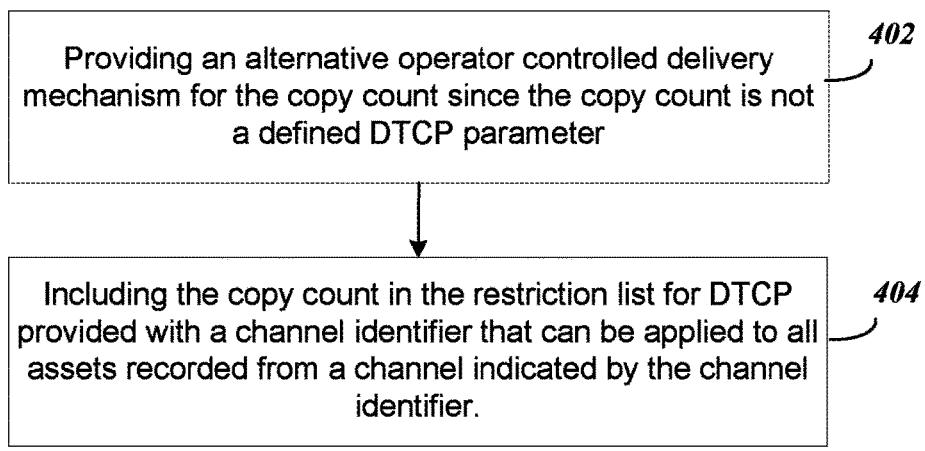
FIG. 4 provides a flow chart illustrating additional steps to those of FIG. 2 applied to provide a copy count parameter since the copy count is not a defined DTCP parameter.

FIG. 4 provides a flow chart illustrating additional steps to those of FIG. 2 applied to provide a max copy count parameter since the copy count is not a defined DTCP parameter. Where does the max copy count come from? DTCP does not address this issue, although it provides a way to pass such parameters further downstream if desired. As indicated, in DTCP, the max copy count value is not a defined parameter. Thus, in a further embodiment of the present invention, the max copy count or Max Copy Count value is provided in DTCP as a defined alternate operator controlled delivery mechanism rather than a defined parameter in step 402. Further in this embodiment, in step 404, a restriction list is provided with the Max Copy Count value and a channel identifier so that Max Copy Count can be applied to all assets recorded from that channel.

Hash Function Examples

Next, different hashing functions that can be applied to a checked out asset are considered. Several different hashing functions can be used for the abbreviated representation of the copy asset. The different hashing functions include: (a) CRC based hash; (b) a cryptographic hash; and (c) an additive arithmetic hash operation. When deciding which method is most appropriate in a given system, considerations must be made for the source device (such as cable system operator) and sink device (such as a table computer video player). Different hash functions are considered in sections to follow.

1. The CRC Hash

A cyclic redundancy check (CRC) is an error-detecting code commonly used in digital networks and storage devices to detect accidental changes to raw data. Blocks of data entering these systems get a short "check value" attached based on the division of their contents. On retrieval of the data the calculation is repeated, and corrective action can be taken against presumed data corruption if the check values do not match. CRCs are so called because the "check value" is a redundancy and expands the data message only slightly without adding information. CRCs are popular because they are simple to implement in binary hardware, easy to analyze mathematically, and particularly good at detecting common errors caused by noise in transmission channels. Because the check value has a fixed length, the function that generates it is occasionally used as a hash function.

The advantages and disadvantages of the CRC based abbreviated representation method are considered for embodiments of the present invention. CRC is a very fast, light weight algorithm but it is not a cryptographic hashing algorithm so it can be easily spoofed and can be prone to collisions. The fact it is light weight and it can operate on data in real-time (on the fly as it is received and not in the background) on mobile devices makes it an attractive option to consider as the basis for an abbreviated representation generation algorithm. Secure book-keeping activities on a source device for the purpose of maintaining a check-out ledger will alleviate any concerns over spoofing vulnerabilities so this should not detract from using the CRC. The fact that CRC is prone to collisions is a concern as the scenario where the same abbreviated representation could be derived from different content sources could result in the copy counts being incremented for the wrong copies during a check-in operation. This concern could also be alleviated by basing the CRC algorithm on a large enough polynomial. The higher order the polynomial, the less likely there is a chance for collision. Another disadvantage of the CRC solution is that it is vulnerable to replay attacks.

2. The Cryptographic Hash

An abbreviated representation can also be generated from a cryptographic hash such as one of the Secure Hash Algorithm (SHA) based derivatives. A goal, however, is to enable a very rapid transfer back of an asset to the source device from a sink device. An asset stored on the mobile sink device should be transferred to that mobile device as fast as possible, so it is stored on the mobile device in encrypted form (decrypting and re-encryption the content for storage could prove too costly for the mobile device). Creation of a cryptographic hash involves a cryptographic operation over 100% of the content, and likely takes a very long time. This may make a solution based on the cryptographic hash undesirable. However, good cryptographic hash functions do yield a good distribution of outputs given random inputs so as to minimize collisions. Collision avoidance is desirable in an abbreviated representation generator.

An implementation could leverage a cryptographic hash without incurring penalties related to decrypting the asset prior to generating the hash as described in the following. The cryptographic hash would be created on the fly for each packet as PCPs (packets) are transferred to the mobile device. The hash would be created from the DTCP encrypted version of the asset. As such, a mobile device would not have to decrypt the asset in order to reconstruct the hash. The mobile device could receive the data as a high priority function and calculate the hash in a background process at its leisure (in a low priority process). Each transfer of the same copy asset would generate a unique abbreviated representation since the DTCP key used to encrypt the asset would differ with each transfer. In the extreme case, if a mobile device checked out two copies of the same copy asset, the PVR would maintain two Abbreviated Representations (ARs) for each transfer and associated with a unique ID of the device which checked-out those assets.

3. Additive Arithmetic Hash Operation

Optimally, it is desirable is to have an abbreviated representation generator that provides the benefits of the previous hash functions without any of the drawbacks. A solution is needed that is fast and light weight (not CPU intensive for the sake of mobile devices) and provides good collision avoidance. Thus, one example of a third hash function could be a type of additive arithmetic hash method. This additive arithmetic method could be a simple and fast calculation (CRC, XOR) made on all the content, a segment at a time, to make it representative of the whole content. All the abbreviated representations from each segment could then be combined into one abbreviated representation in a fashion to further randomize the total abbreviated representation in an effort to minimize the chance of collisions.

4. Other Abbreviated Hash Representations

Another abbreviated representation generation method could sacrifice effort to create a representation based on all the content for the sake of increased speed. For example, a CRC-like calculation or cryptographic hash could be performed over a fraction of the content only, say, every 10 frames. In another example a Media Authentication Control (MAC) hash could be applied to ensure that no one tampers with the abbreviated asset, the MAC be placed on the asset and run through a cryptographic hash function after transfer to determine if tampering occurred. The AR can more specifically be a form of authenticated encryption (encryption plus MAC) that would be desirable if the AR is not protected by DTCP encryption during transfer.

Any of the above abbreviated representations could be generated from descrambled content data or encrypted content data. Generating abbreviated representations based on the encrypted content data has advantages in that abbreviated representation would be associated with not only the content, but with the check-out session in which the content was transferred to the mobile device. This type of abbreviated representation facilitates ease of check-out book-keeping (tracking which devices check-out which assets) so that devices that attempt a check-in can be thoroughly vetted (authorized for check-in) against a check-out ledger created by book-keeping activities.

Another advantage to basing the generation of the abbreviated representation on the encrypted data is that mobile client does not have decrypt the data (possibly via a background task or at playback) to re-create the abbreviated representation (in all cases, both source and sink need to be coordinated in the same method used to create abbreviated representations). If the method is fast enough, the mobile client can create the abbreviated representation on the fly as content is streamed and be ready to check the content back in to the source device as soon as the check-out transfer is completed, without a delay needed to process content in a dedicated, post-transfer task designed to generate the abbreviated representation. The benefit to basing the generation of the abbreviated representation off of descrambled content data is that, the abbreviated representation is at least one transform closer to the original content. A major drawback of basing the abbreviated representation off of the descrambled content is that the mobile device must perform at least on more, CPU intensive, data transform (decrypting the content) before it can begin to generate the abbreviated representation. This will preclude the mobile client from being able to check-in the content immediately after the check-out as the abbreviated representation while take time, CPU and battery to recreate.

Although the present invention has been described above with particularity, this was merely to teach one of ordinary skill in the art how to make and use the invention. Additional modifications will fall within the scope of the invention as that scope is defined by the following claims.

What is claimed:

1. A method for controlling copy count using a Digital Transmission Content Protection (DTCP) standard, the method comprising:
    maintaining an original master copy of a first video content in a personal video recorder (PVR);
    maintaining a copy count number;
    copying the original master copy as a copy asset and transferring the copy asset from the PVR to a second video device on request for check out by the second video device and marking the transferred copy asset as Copy No More (CNM), and decrementing the copy count, and further creating and storing an abbreviated representation of the copy asset in the PVR and the second video device;
    receiving the copy asset checked back in to the PVR from the second video device in response to a MOVE command, the received copy asset being the abbreviated representation of the checked-out copy from the second video device; and
    comparing the checked in copy asset with the abbreviated representation stored in the PVR to determine if the checked in copy asset is from the identical first video content, and if so incrementing the copy count,
    wherein the abbreviated representation takes the form of a hash constructed from a hashing function, and
    wherein the abbreviated representation can be regenerated with the copy asset alone as an input to the hashing function.

2. The method of claim 1,
    wherein a transfer from the PVR occurs under a Sync n' Go command and the transferred copy is bound with the original copy so that the copy count is decremented when either the copy asset or the original master copy are transferred.

3. The method of claim 1,
    wherein the copy asset checked into the PVR occurs under a Sync n' Go command, and
    wherein both the original copy and the copy asset are maintained in storage in the PVR.

4. The method of claim 1, wherein the abbreviated representation comprises at least one of (a) a CRC based hash function; (b) a cryptographic hash; and (c) an additive arithmetic hash operation.

5. The method of claim 1, wherein the copy asset is a transcoded version of the original master copy.

6. The method of claim 1, wherein the hash function is created using an algorithm provided from or identified by the PVR to the second video device.

* * * * *